UNITED STATES PATENT OFFICE.

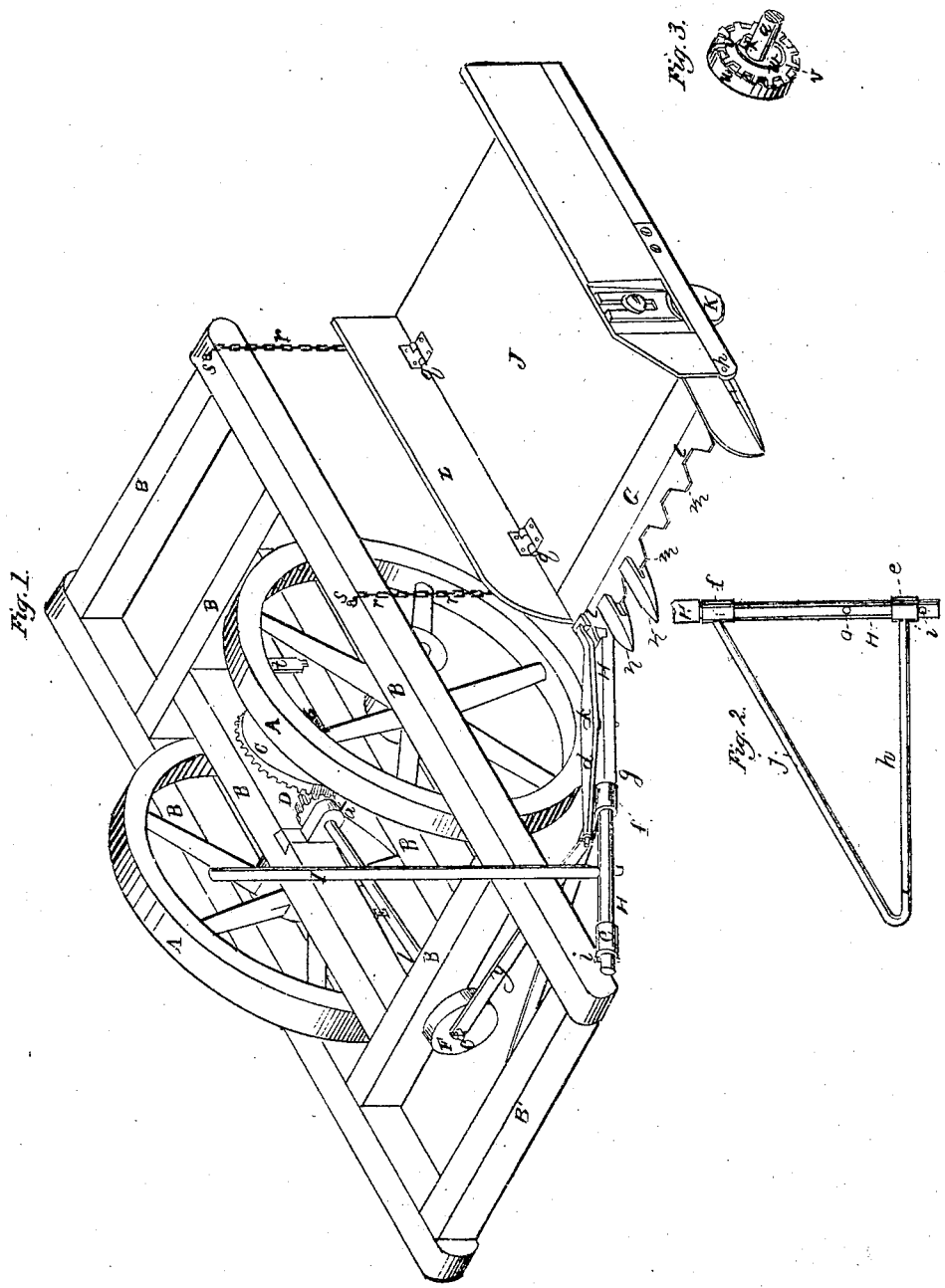

WILLIAM NEFF, OF CENTRE HALL, PENNSYLVANIA.

IMPROVEMENT IN HARVESTING-MACHINES.

Specification forming part of Letters Patent No. 33,539, dated October 22, 1861.

*To all whom it may concern:*

Be it known that I, WILLIAM NEFF, of Centre Hall, in the county of Centre and State of Pennsylvania, have invented certain new and useful Improvements in Machines for Harvesting Grain and Grass; and I do hereby declare the following to be a full, clear, and exact description of the construction and operation of the same, reference being had to the accompanying drawings, making a part of this specification, in which—

Figure 1 represents a perspective view of so much of the machine as will illustrate my invention. Fig. 2 represents the brace-bar, that braces the coupling-arm to the main frame. Fig. 3 represents a view of the spring-clutch, for holding the wheels to the axle when the machine is moving forward.

In mowing grass especially, it is important that the cutting apparatus should travel close to the ground, and conform to the undulations thereof; otherwise the grass will be unevenly cropped. For this purpose the finger-bar, which supports and carries the cutters, is so coupled and united to the main frame as to allow it to freely rise and fall in conforming to the slopes or undulations that it passes over without being influenced by the inequalities in the path of the carrying and driving wheels; but while this finger-bar is thus left free to rise and fall independent of the rising and falling of the main wheels and main frame, it must be secured against any lateral variation from its direct path, which would, if allowed, cramp, bind, and choke up the cutters, and the cutters must not be allowed to stop for a moment while the machine is progressing over the ground, for this immediately fills them with torn-up and dragged grass, that entirely clogs them up, and frequently breaks up the machine.

My invention consists in the peculiar construction and arrangement of the coupling-arm and brace-bar which I use for securing the finger-beam to the main frame, and allowing the said finger-beam to conform itself to the varying surface of the ground over which it passes, and uninfluenced by the rising and falling motions of the main wheels or main frame; and it further consists in hinging the platform to the finger-beam, and hinging the inside fence or side board of the platform to the platform, and suspending the platform to the main frame by flexible and adjustable connections for the triple purpose of making said platform removable, for adjusting its height above the ground, and to admit of its being turned up close to, so as to be leaned against and carried by, the main frame when being transported from field to field; and it further consists in the peculiar construction of the spring-clutch for keeping the wheels fast on the axle while the machine is being moved forward, and allowing them to turn independent thereof when the machine is backed.

To enable others skilled in the art to make and use my invention, I will proceed to describe the same with reference to the drawings.

A A represent a pair of carrying and driving wheels loosely attached to the opposite ends of a common axle, $a$. The main frame B is balanced, or nearly so, on the axle of the wheels A, and upon this axle there is a gear-wheel (not seen in the drawings) that drives a pinion on the shaft $b$, and gives motion to said shaft; and upon this shaft $b$ is placed a bevel-gear, C, that takes into and turns a pinion, D, on one end of the shaft E, the other end thereof being furnished with a crank-wheel, F, (to a wrist-pin, $c$, in which one end of the pitman $y$ is attached,) the other end of the pitman being connected to the upper end of the vibrating lever $d$, for the purpose of driving the cutters, as will be hereinafter described.

G is the finger-beam. It is secured to the main frame by a coupling-arm, H, to the lower end of which it is fastened, the upper end of said coupling-arm passing through two sleeves, $e\ f$, formed on the brace-bar, and in which sleeves said coupling-arm can turn, as it is rounded off for this purpose. When the coupling-arm is slipped through the sleeves $e\ f$ up to its shoulder $g$, and the pin $i$ inserted at the other sleeve, the connection is firm, while the coupling-arm is free to turn in its supports. The brace-bar is of a V form, its leg $h$ being secured to the front cross-bar, B', of the main frame by eyebolts, in which it can freely turn, while the other leg, $j$, serves as a diagonal brace from said main frame to the coupling-arm, to keep the coupling-arm from moving laterally. The vibrating lever $d$ is pivoted at $k$ to the coupling-arm H, and its lower end is connected to the cutter-bar $l$, so as to operate said bar and its cutters $m$ through the fingers $n$.

The pivot k may be nearer to the cutter-bar than shown in the drawings, so that the stroke of the cutters may be commensurate with the power of the machine. In the coupling-arm H there is a hole, o, designed for the lever I, which extends up to or near the driver's seat, so that the driver may by means of said lever raise and lower the finger-bar whenever it becomes necessary to do so; and the lever I is made removable from the coupling-arm, so that it will not prevent the platform or finger-bar from being turned up and leaned against so as to be carried by the main frame.

The platform or table J is hinged, as at p, to each end of the finger-bar, and has upon it an outside adjusting-wheel, K. The side L of the platform is hinged at q to the table, so that it may be turned down onto the table when the platform is to be folded up against the main frame to be carried there. The main-frame side of the platform is suspended to the main frame by means of the chains r r, the links of which catch over pins s s, and by means of which said platform may be adjusted as to height.

A pin, t, is fixed against the end of the shaft b, which holds its gear C up to the bevel-gear on the shaft E; but when the machine is moved from place to place this pin may be drawn out, which allows the shaft to slip endwise and move C out of gear with D and stop the working of the cutter-bar.

The clutch for uniting the wheels and axle when the machine is going forward, and disconnecting them when backing, is made as follows: On the inside ends of the hubs are formed ratchet-teeth u, and on the axle near thereto are keyed, by a feather and slot, as at x, (so as to slip along the axle but always to turn with it,) the star-wheel v, having springs w behind them to throw their teeth into gear with the ratchet-teeth. When the machine is moved forward these teeth catch against the square shoulders of the ratchet-teeth and hold the wheel and axle together; but when the machine is backed the inclined parts of the ratchet-teeth force the star-wheels away from them—the elasticity of the springs w admitting of this—and then the wheels turn independently of the axle. Both of the main wheels are drivers independent of each other, so that in turning the machine around, where one wheel stands comparatively still and the other one moves, the cutters will continue to work, and thus prevent the grass from clogging them.

The driver's seat should be located at a point at or over the main axle, and may be made to slide on the longitudinal pieces of the main frame, so that the driver may dispose of his weight as will best tend to balance the machine.

The tongue is fastened to the main frame in any of the usual ways, so that the team may travel alongside of the standing grass or grain and in the previously-cut swath.

Having thus fully described the nature and object of my invention, what I claim therein as new, and desire to secure by Letters Patent, is—

1. In combination with a rolling coupling-arm, the hinged V-shaped brace, with its bosses, for the purpose of so uniting the finger-bar to the main frame as that it may conform to the undulations of the ground over which it passes, and be turned up against and be carried by the main frame when transporting the machine from place to place, substantially as described.

2. In combination with a hinged or yielding finger-bar, a hinged platform, a hinged side piece, and the flexible and adjustable suspending devices, so that the platform may be adjusted as to height and so that the finger-beam and platform may be folded up against, to be carried by, the main frame when transporting the machine from place to place, substantially as described.

3. As a clutching and unclutching device for making the wheels and axle of a harvesting-machine move together or independent of each other, the combination of the ratchets u, star-wheels v, with their springs, slots, and feathers, as herein-described and represented.

WILLIAM NEFF.

Witnesses:
G. H. WEAVER,
JOHN L. JOHNSTON.